(12) United States Patent
Matsuoka (10) Patent No.: US 12,360,399 B2
(45) Date of Patent: Jul. 15, 2025

(54) EYEGLASS LENS (71) Applicant: HOYA LENS THAILAND LTD., Pathumthani (TH)

(72) Inventor: Shohei Matsuoka, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 499 days.

(21) Appl. No.: 17/770,021

(22) PCT Filed: Dec. 18, 2020

(86) PCT No.: PCT/JP2020/047440
§ 371 (c)(1),
(2) Date: Apr. 18, 2022

(87) PCT Pub. No.: WO2021/132079
PCT Pub. Date: Jul. 1, 2021

(65) Prior Publication Data
US 2022/0390764 A1 Dec. 8, 2022

(30) Foreign Application Priority Data
Dec. 23, 2019 (JP) .................................. 2019-231894

(51) Int. Cl.
*G02C 7/06* (2006.01)
(52) U.S. Cl.
CPC ...................................... *G02C 7/06* (2013.01)
(58) Field of Classification Search
None
See application file for complete search history.

(56) References Cited

U.S. PATENT DOCUMENTS

| | | | | |
|---|---|---|---|---|
| 10,571,717 B2 * | 2/2020 | Neitz | ........................ | G02C 7/16 |
| 10,962,804 B1 * | 3/2021 | Guillot | .................... | G02C 7/086 |
| 11,947,191 B2 * | 4/2024 | Qi | ........................... | G02C 7/022 |
| 12,007,626 B2 * | 6/2024 | Sonehara | ............... | G02C 7/022 |
| 12,013,598 B2 * | 6/2024 | Qi | ............................. | G02B 1/11 |
| 2013/0297015 A1 | 11/2013 | Johns et al. | | |
| 2016/0377884 A1 * | 12/2016 | Lau | ........................ | G02C 7/041 |
| | | | | 351/159.05 |

(Continued)

FOREIGN PATENT DOCUMENTS

| | | | |
|---|---|---|---|
| JP | 2017010031 A | 1/2017 | |
| WO | 2018076057 A1 | 5/2018 | |
| WO | 2019189847 A1 | 10/2019 | |

OTHER PUBLICATIONS

PCT/JP2020/047440, "International Preliminary Report on Patentability", Jul. 7, 2022, 7 pages.

(Continued)

*Primary Examiner* — Darryl J Collins
(74) *Attorney, Agent, or Firm* — Oliff PLC (57) ABSTRACT

Provided is an eyeglass lens including: a first region formed such that light transmitted therethrough is focused at a predetermined position in an eye; and a plurality of second regions formed such that light transmitted therethrough is focused at a position defocused from the predetermined position, wherein the plurality of second regions are formed to have a size and an arrangement interval such that light perceived in peripheral vision is perceived as pseudo-focusing at a position other than the predetermined position.

19 Claims, 5 Drawing Sheets

(56) References Cited

U.S. PATENT DOCUMENTS

2017/0131567 A1\* 5/2017 To ............................ G02C 7/06
2019/0235279 A1\* 8/2019 Hones ...................... G02C 7/10
2020/0132441 A1  4/2020 Uchidani et al.
2021/0048690 A1\* 2/2021 Guillot .................. G02C 7/086
2022/0082860 A1\* 3/2022 Guillot .................. G02C 7/086

OTHER PUBLICATIONS

PCT/JP2020/047440, "English Translation of International Search Report", Mar. 9, 2021, 4 pages.
EP20906337.9, "Extended European Search Report", Jun. 15, 2023, 10 pages.

\* cited by examiner

+3.4D
(Segment's focus)  +1.7D  0D (Base's focus)

+3.4D
(Segment's focus)  +1.7D  0D (Base's focus)

EYEGLASS LENS

CROSS-REFERENCE TO RELATED APPLICATIONS

This application is the National Stage of International Application No. PCT/JP2020/047440, filed Dec. 18, 2020, which claims priority to Japanese Patent Application No. 2019-231894, filed Dec. 23, 2019, and the contents of which is incorporated by references.

TECHNICAL FIELD

The present disclosure relates to an eyeglass lens.

BACKGROUND ART

In recent years, the number of people with near-sightedness has been on the rise. It has been reported that the progression of near-sightedness is accelerated when part of the light that enters an eyeball is imaged at the back of the retina, while it is suppressed when part of the light is imaged at the front.

For this reason, there are eyeglass lenses for suppressing the progression of a refractive error such as near-sightedness, including a first region formed such that light transmitted therethrough is focused at a predetermined position (e.g., a position on the retina of an eyeball) and a second region formed such that light transmitted therethrough is focused at a position different from the predetermined position (e.g., a position other than on the retina of the eyeball). Specifically, there are eyeglass lenses in which a convex surface as the first region, which is an object-side surface, includes a plurality of convex regions having a curved surface different from the convex surface and projecting from the convex surface as the second regions (see Patent Document 1, for example).

According to eyeglass lenses with this configuration, rays that enter a lens from an object-side surface and exiting from an eyeball-side surface are focused on a retina of a wearer in principle, but rays that pass through the convex regions are focused at a position that is closer to an object than the retina is. That is to say, the approach taken is to reduce the amount of light that is imaged at the back of the retina and increase the amount of light that is imaged at the front, thereby suppressing the progression of near-sightedness.

CITATION LIST

Patent Document

Patent Document 1: U.S. Patent Application Publication No. 2017/0131567

SUMMARY OF DISCLOSURE

Technical Problem

Light that enters an eyeball is perceived not only in a central visual field including a central fovea of the retina but also in a peripheral visual field outside the central visual field.

It is known that, however, when perceiving light that enters an eyeball, the central visual field is more sensitive to light-dark patterns with high spatial frequency, while the peripheral visual field is more sensitive to light-dark patterns with low spatial frequency. That is to say, the peripheral visual field has a lower spatial resolution than the central visual field, and light stimuli that are used as cues to locate the focal point are perceived differently in the peripheral visual field than in the central visual field.

Accordingly, in peripheral vision, it may not be perceived that light transmitted through the second regions is focused at a position that is closer to an object than the retina is, as a result of which the effect of suppressing the progression of near-sightedness may not be exerted.

It is conceivable to address this issue by making the lens structure different between the portion corresponding to the central visual field and the portion corresponding to the peripheral visual field. Specifically, it is conceivable to make the shape, power, or the like of the second regions different between the portion corresponding to the central visual field and the portion corresponding to the peripheral visual field, or to provide one of the portions with a stronger image surface curvature. However, when the lens structure is made partially different, the surface of the entire lens will become uneven and the appearance will be spoiled. Furthermore, when the eyeball is rotated, the correspondence between the distribution of the lens structure and the line of sight changes, and thus the effect may not always be sufficient.

It is an aspect of the present disclosure to provide a technique for making an eyeglass lens exert an effect of suppressing the progression of a refractive error in peripheral vision as well.

Solution to Problem

The present disclosure was devised in order to achieve the above-mentioned aspect.

A first aspect of the present disclosure is directed to an eyeglass lens including: a first region formed such that light transmitted therethrough is focused at a predetermined position in an eye; and a plurality of second regions formed such that light transmitted therethrough is focused at a position defocused from the predetermined position, wherein the plurality of second regions are formed to have a size and an arrangement interval such that light perceived in peripheral vision is perceived as pseudo-focusing at a position other than the predetermined position.

A second aspect of the present disclosure is directed to the eyeglass lens according to the first aspect, wherein a size and an arrangement interval of the plurality of second regions are set such that an evaluation value using a Gabor function for the transmitted light in the peripheral vision has a maximum value at a position other than the predetermined position.

A third aspect of the present disclosure is directed to the eyeglass lens according to the first or second aspect, wherein a size and an arrangement interval of the plurality of second regions are set such that an evaluation value using a Gabor function for the transmitted light in the peripheral vision has a largest value at a position other than the predetermined position.

A fourth aspect of the present disclosure is directed to the eyeglass lens according to any one of the first to third aspects, wherein a size and an arrangement interval of the plurality of second regions are set such that at least three of the plurality of second regions are arranged within a range of a diameter of a pupil through which the transmitted light passes and such that a graphic formed by connecting reference points of the respective three second regions is an acute-angle triangle.

A fifth aspect of the present disclosure is directed to the eyeglass lens according to any one of the first to fourth aspects, wherein $D^2 \leq (4K/3) \times \cos 25°$ is satisfied, when a diameter of each of the second regions that are circular in a plan view is taken as D, and an area ratio of the second regions per unit area on the lens surface is taken as K.

A sixth aspect of the present disclosure is directed to the eyeglass lens according to any one of the first to fourth aspects, wherein $D^2 \leq (4K/3) \times \cos 45°$ is satisfied, when a diameter of each of the second regions that are circular in a plan view is taken as D, and an area ratio of the second regions per unit area on the lens surface is taken as K.

A seventh aspect of the present disclosure is directed to the eyeglass lens according to the fifth or sixth aspect, wherein $LP/(60+P) \geq 0.010$ is satisfied, when an interval between adjacent second regions is taken as L, and a power that is given to the second regions is taken as P.

An eighth aspect of the present disclosure is directed to the eyeglass lens according to any one of the fifth to seventh aspects, wherein a power difference ΔP between the plurality of second regions has a largest value of 0.25 or less.

A ninth aspect of the present disclosure is directed to the eyeglass lens according to any one of the first to eighth aspects, wherein the plurality of second regions are arranged in a hexagon formation.

A tenth aspect of the present disclosure is directed to an eyeglass lens including: a first region formed such that light transmitted therethrough is focused at a predetermined position in an eye; and a plurality of second regions formed such that light transmitted therethrough is focused at a position defocused from the predetermined position, wherein the plurality of second regions are formed to have a size and an arrangement interval such that at least three of the plurality of second regions are arranged within a range of a diameter of a pupil through which the transmitted light passes and such that a graphic formed by connecting reference points of the respective three second regions is an acute-angle triangle.

An eleventh aspect of the present disclosure is directed to the eyeglass lens according to the tenth aspect, wherein $D^2 \leq (4K/3) \times \cos 25°$ is satisfied, when a diameter of each of the second regions that are circular in a plan view is taken as D, and an area ratio of the second regions per unit area on the lens surface is taken as K.

A twelfth aspect of the present disclosure is directed to the eyeglass lens according to the tenth aspect, wherein $D^2 \leq (4K/3) \times \cos 45°$ is satisfied, when a diameter of each of the second regions that are circular in a plan view is taken as D, and an area ratio of the second regions per unit area on the lens surface is taken as K.

A thirteenth aspect of the present disclosure is directed to the eyeglass lens according to the eleventh or twelfth aspect, wherein $LP/(60+P) \geq 0.010$ is satisfied, when an interval between adjacent second regions is taken as L, and a power that is given to the second regions is taken as P.

A fourteenth aspect of the present disclosure is directed to the eyeglass lens according to any one of the eleventh to thirteenth aspects, wherein a power difference ΔP between the plurality of second regions has a largest value of 0.25 or less.

Advantageous Effects of Disclosure

According to the present disclosure, it is possible to make an eyeglass lens exert an effect of suppressing the progression of a refractive error in peripheral vision as well.

DESCRIPTION OF EMBODIMENTS

Hereinafter, an embodiment of the present disclosure will be described with reference to the drawings. Note that the following description is by way of example, and the disclosure is not limited to the illustrated aspects.

(1) Configuration of Eyeglass Lens

First, the configuration of an eyeglass lens given as an example of this embodiment will be described.

The eyeglass lens given as an example of this embodiment is a refractive error progression suppressing lens for suppressing the progression of a refractive error in an eye of a wearer of the glass. The refractive error progression suppressing lens includes a first region having a first refractive power based on a prescription for correcting a refractive error in an eye, and a second region having a refractive power different from the first refractive power and having a function to focus light on a position other than the retina of the eye so as to suppress the progression of a refractive error in the eye.

Refractive error progression suppressing lenses include near-sightedness progression suppressing lenses for suppressing the progression of near-sightedness and far-sightedness progression suppressing lenses for suppressing the progression of far-sightedness. In the description below, a near-sightedness progression suppressing lens will be described as an example.

Figure 1:
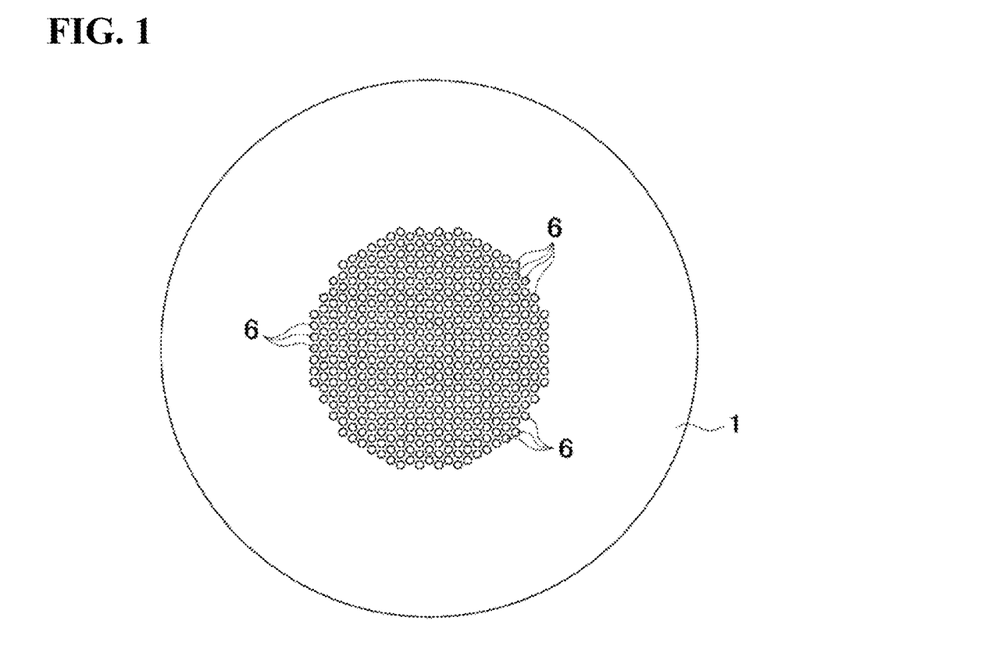
FIG. 1 is a front view showing an example of an eyeglass lens according to an embodiment of the present disclosure.
Figure 2:
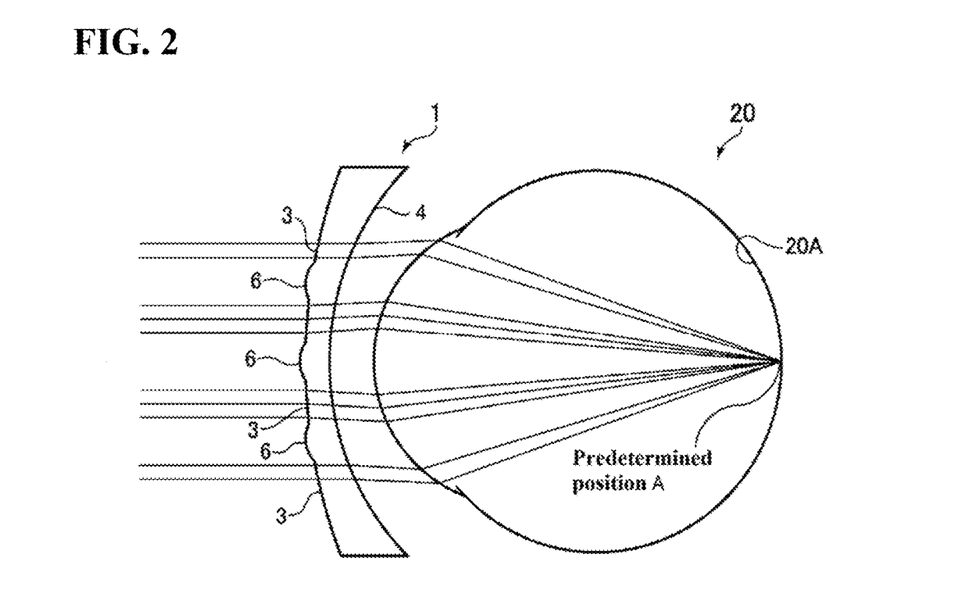
FIG. 2 is a schematic cross-sectional view (1) showing paths of light that is transmitted through the eyeglass lens shown in FIG. 1.
Figure 3:
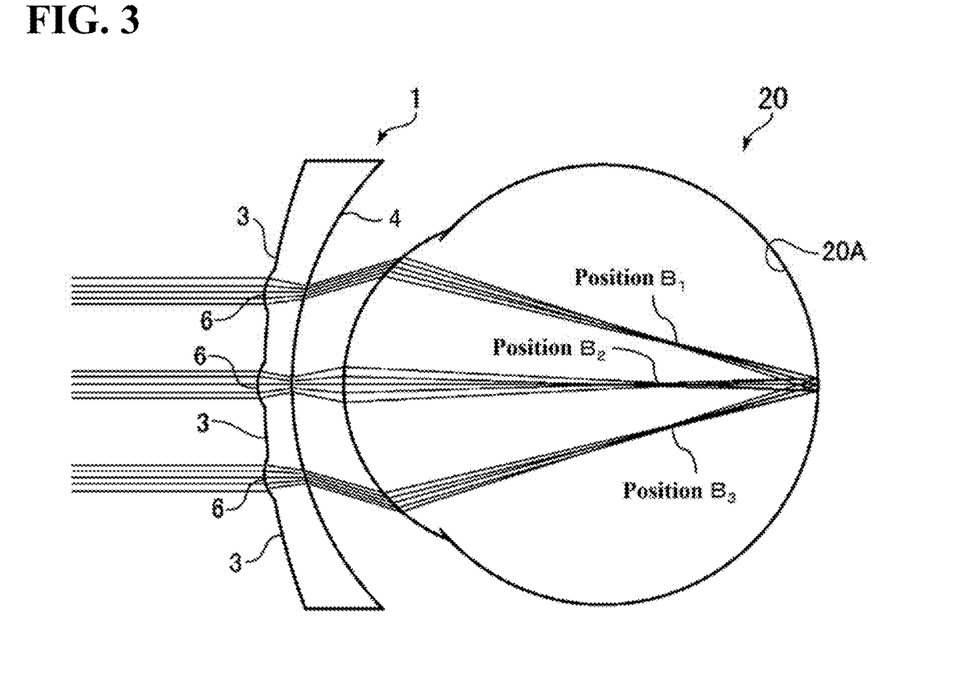
FIG. 3 is a schematic cross-sectional view (2) showing paths of light that is transmitted through the eyeglass lens shown in FIG. 1.

FIG. 1 is a front view showing an example of an eyeglass lens this embodiment. FIGS. 2 and 3 are schematic cross-sectional views showing paths of light that is transmitted through the eyeglass lens shown in FIG. 1.

Overall Configuration

An eyeglass lens 1 according to this embodiment has an object-side surface and an eyeball-side surface. The "object-side surface" is the surface that is located on the object side when a wearer wears the glasses including the eyeglass lens 1. The "eyeball-side surface" is the surface that is located on the opposite side, that is, the eyeball side, when the wearer wears the glasses including the eyeglass lens 1. In this embodiment, the object-side surface is a convex surface, and the eyeball-side surface is a concave surface. That is to say, the eyeglass lens 1 is a meniscus lens.

Furthermore, the eyeglass lens 1 includes a lens base member. The lens base member is made of a thermosetting resin material such as a thiourethane resin, an allyl resin, an acrylic resin, or an epithio resin material, for example. Note that another resin material having a desired refractivity may be selected as the resin material constituting the lens base member. Also, the lens base member may be a lens base member made of inorganic glass, instead of a resin material.

A coating is formed on at least one of the object-side surface and the eyeball-side surface of the lens base member. Examples of the coating include a hard coating film and an antireflection film (AR film), but other types of films may also be formed in addition to these films.

The hard coating film is formed using a thermoplastic resin or a UV-curable resin, for example. The hard coating film can be formed using a method of immersing the lens base member in a hard coating liquid, through spin coating, or the like. An improvement in durability of the eyeglass lens 1 is achieved through this coating with the hard coating film.

The antireflection film is formed by forming a film of an antireflection agent such as $ZrO_2$, $MgF_2$, or $Al_2O_3$ through vacuum deposition, for example. The visibility of an image seen through the eyeglass lens 1 can be improved by covering the eyeglass lens with the antireflection film.

Convex Region

In the eyeglass lens 1 according to this embodiment, for example, the object-side surface (convex surface) of the lens base member has a plurality of convex regions that project from this surface toward an object. The convex regions are each constituted by a curved surface with a curvature different from that of the object-side surface of the lens base member. When the lens base member having such convex regions is covered by a coating such as a hard coating film or an antireflection film, a plurality of convex regions are formed on the surface of that coating as well due to the convex regions of the lens base member. That is to say, the object-side surface (convex surface) of the eyeglass lens 1 has a plurality of convex regions 6 that project from this surface toward an object according to the convex regions of the lens base member and the thickness of the coating that covers the convex regions. Although a case in which the plurality of convex regions 6 are arranged on the object-side surface is described as an example, there is no limitation thereto, and it is sufficient that the convex regions are formed on at least one of the object-side surface and the eyeball-side surface.

As shown in FIG. 1, the plurality of convex regions 6 are regularly arranged on the surface of the eyeglass lens 1. In the drawing of this example, the plurality of convex regions 6 are arranged on part of the lens near the center, but there is no limitation thereto, and the convex regions 6 may be arranged on the entire surface of the lens or circumferentially arranged around the center of the lens as long as the convex regions are regularly arranged.

Furthermore, the plurality of convex regions 6 are arranged in an island-like manner independently from each other (i.e., they are separated from each other without being in contact with each other). That is to say, in this embodiment, the convex regions 6 are arranged in a discrete manner (i.e., they are not continuous and are scattered in a discrete manner). Although a case in which all the convex regions 6 are arranged in an island-like manner independently from each other is described as an example, there is no limitation thereto, and the convex regions 6 may be arranged such that so as to include those where the outer edges of adjacent regions are connected to each other or in contact with each other.

Optical Properties

With the eyeglass lens 1 having the above-described configuration, the following optical properties can be realized due to the object-side surface 3 having the convex regions 6, as a result of which it is possible to suppress the progression of a refractive error such as near-sightedness of the wearer of the glasses.

As shown in FIG. 2, light that has entered the object-side surface 3 of the eyeglass lens 1 in a region (referred to a "base region" hereinafter) where the convex regions 6 are not formed is emitted from the eyeball-side surface 4 and is focused on a retina 20A of an eyeball 20. That is to say, in principle, the rays that are transmitted through the eyeglass lens 1 are focused on the retina 20A of the wearer of the glasses. In other words, the curvature of the base region of the eyeglass lens 1 is set according to the prescription of the wearer of the glasses such that a focal point is formed on the retina 20A, which is a predetermined position A. Accordingly, the base region of the eyeglass lens 1 functions as a "first region" having a first refractive power based on a prescription for correcting a refractive error in the eye of the wearer of the glasses and formed such that light transmitted through the lens is focused on the retina 20A, which is the predetermined position A. The term "focus" in this specification means that light is concentrated and forms an image, wherein the image does not absolutely have to be an aberration-free image and may have spherical aberration or astigmatism. The term "focus" in this specification means a point recognized as a point with the maximum value for vision.

Meanwhile, as shown in FIG. 3, light that has entered the convex regions 6 of the eyeglass lens 1 is emitted from the eyeball-side surface 4 and is focused at a position (defocused position) that is closer to an object than the retina 20A of the eyeball 20 is. That is to say, the convex regions 6 cause light that has been emitted from the eyeball-side surface 4 to converge at a position B that is closer to an object than the predetermined position A is. The convergence position B is present as positions $B_1, B_2, B_3, \ldots B_N$ according to each of the plurality of convex regions 6. Accordingly, each of the plurality of convex regions 6 functions as a "second region" formed such that light transmitted through the lens is focused at the position B, which is defocused from the predetermined position A. Hereinafter, the convex regions 6 functioning as the second regions are alternatively referred to as "segments".

In this manner, the eyeglass lens 1 in principle causes rays that have entered from the object-side surface 3 to be emitted from the eyeball-side surface 4 and converge at the predetermined position A, whereas, in the portion in which the segments 6 are arranged, the eyeglass lens causes rays to converge at the position B ($B_1, B_2, B_3, \ldots B_N$) that is closer to an object than the predetermined position A is. That is to say, the eyeglass lens 1 has a function to cause rays to converge at the position B that is closer to an object, the function being different from the ray converging function for realizing the prescription of the wearer of the glasses. The eyeglass lens 1 can exert the effect of suppressing the progression of a refractive error such as near-sightedness of the wearer of the glasses (referred to as a "near-sightedness suppression effect" hereinafter) due to having such optical properties.

(2) Summary of Peripheral Vision

The above-described optical properties of the eyeglass lens 1 are mainly for the cases in which light that has entered is transmitted through the lens to a central visual field including a central fovea of the retina and is perceived in a portion corresponding to the central visual field. Note that the retina of the eyeball corresponds to the peripheral vision as well. The term "peripheral vision" herein means perceiving light at a portion corresponding to the peripheral visual field outside the central visual field.

Figure 4:
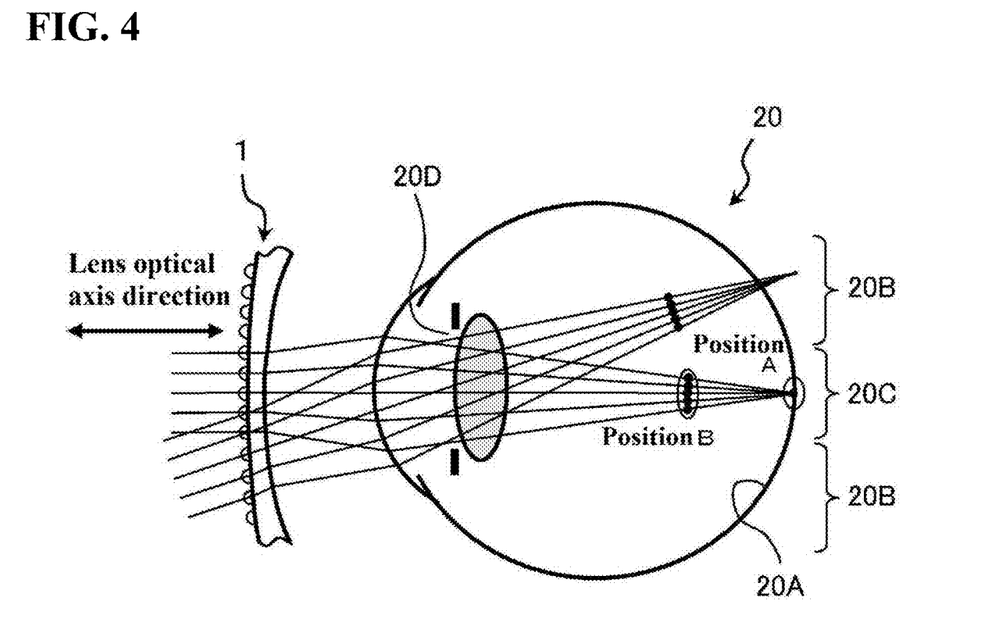
FIG. 4 is a schematic cross-sectional view showing paths of main rays of light that enter respective segments, in central and peripheral views.

FIG. 4 is a schematic cross-sectional view showing paths of main rays of light that enter respective segments, in central and peripheral views.

In many cases, including the example in FIG. 4, light that reaches a peripheral visual field 20B enters the eyeglass lens 1, at an angle relative to light that reaches the central visual field 20C.

The light at an angle relative to light that reaches the central visual field 20C passes through the eyeglass lens 1 and further through a pupil 20D of the eyeball 20 to the portion corresponding to the peripheral visual field 20B of the retina 20A and is perceived in the peripheral visual field 20B. The peripheral visual field 20B has a spatial resolution lower than that of the central visual field 20C. Specifically, the photoreceptor cells of the peripheral visual field 20B have only 10 to 20% of the resolution of the central visual field 20C. Accordingly, in the peripheral visual field 20B, light stimuli that are used as cues to locate the focal point may be perceived differently than in the central visual field 20C.

Accordingly, in the peripheral vision, even when light converges at the position B as described above, the peripheral visual field 20B may not detect the light. That is to say, in the peripheral visual field 20B, light stimuli that are used as cues to locate the focal point are different from those in the central visual field 20C, and thus it may not be perceived that light transmitted through the segments 6 of the eyeglass lens 1 is focused at the position B that is closer to an object than the retina 20A is, as a result of which the effect of suppressing the progression of near-sightedness may not be exerted.

Hereinafter, a difference between an image perceived in the central visual field 20C and an image perceived in the peripheral visual field 20B will be described in detail.

Figure 5:
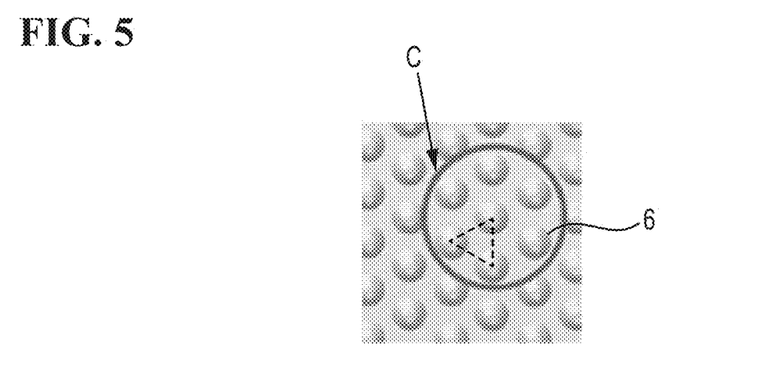
FIG. 5 is an enlarged partial view showing an arrangement example of convex regions of the eyeglass lens shown in FIG. 1.

FIG. 5 is an enlarged partial view showing an arrangement example of the segments 6 in the eyeglass lens 1.

In this example, a region C in which seven segments 6 are arranged in a hexagon formation as shown in FIG. 5 is used to describe how light transmitted through the segments 6 in the region C is perceived.

Figure 6:
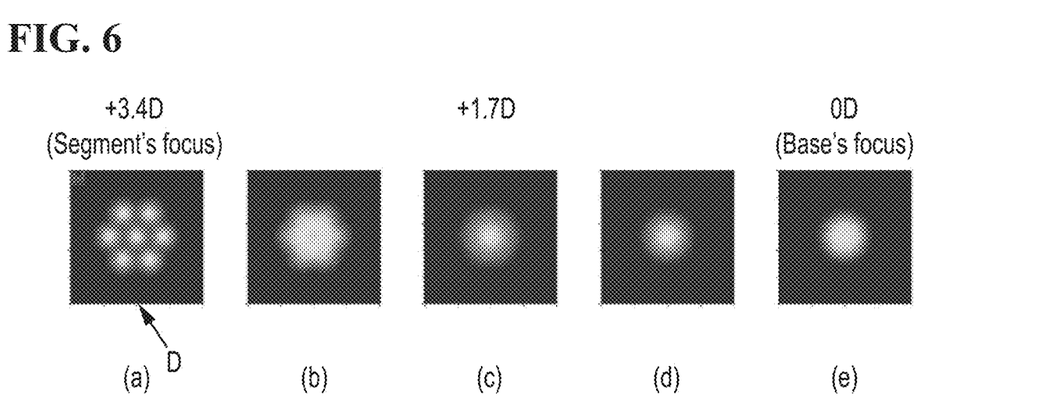
FIG. 6 is an explanatory view showing a simulated image when light that is transmitted through the convex regions shown in FIG. 5 is perceived in a central visual field of an eyeball.

FIG. 6 is an explanatory view showing a simulated image when light that is transmitted through the segments 6 of the eyeglass lens 1 is perceived in the central visual field 20C of the eyeball 20.

This drawing shows a simulation result regarding the eyeglass lens 1 in which the segments 6 are formed such that light transmitted therethrough is focused at a position B that is closer to an object than a predetermined position A is by "3.4 D" when the predetermined position A on the retina 20A is taken as "0 D (diopters)", as to how light that is transmitted through the segments 6 is perceived in the central visual field 20C at a plurality of points from 3.4 D to 0 D.

As shown in FIG. 6, according to the simulation considering the resolution of the central visual field 20C, it is seen that light spots formed through transmission through the respective segments 6 are perceived as being most focused, that is, the diameter of the white circles in the drawing showing the perceived state of light is the smallest (see the arrow D in FIG. 6) at the position B (i.e., the position at +3.4 D).

Figure 7:
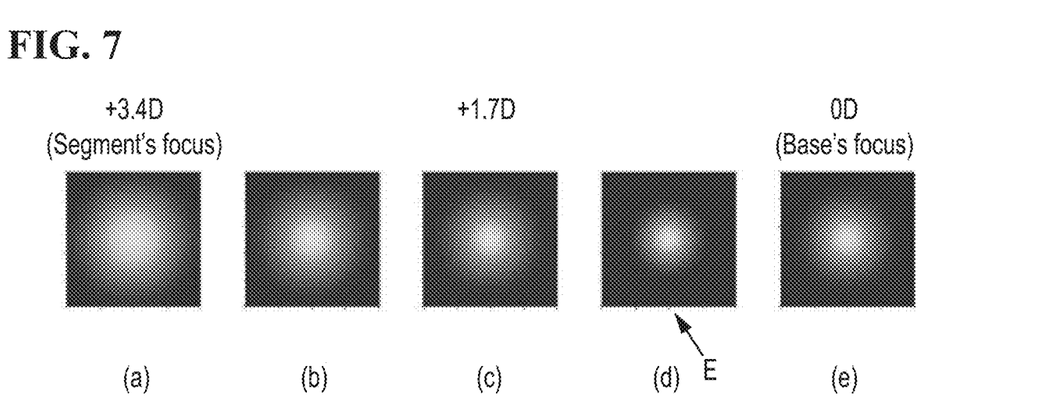
FIG. 7 is an explanatory view showing a simulated image when light that is transmitted through the convex regions shown in FIG. 5 is perceived in a peripheral visual field of an eyeball.

FIG. 7 is an explanatory view showing a simulated image when light that is transmitted through the segments 6 of the eyeglass lens 1 is perceived in the peripheral visual field 20B of the eyeball 20.

This drawing also shows a simulation result at a plurality of points from the predetermined position A (0 D) to the position B (+3.4 D) that is closer to an object than the position A is, as in the case of the central visual field 20C described above.

As shown in FIG. 7, according to the simulation considering the resolution of the peripheral visual field 20B, contrary to the case of the central visual field 20C described above, light is not perceived as being most focused at the position B (i.e., the position at +3.4 D). That is to say, it is seen that light spots formed through transmission through the respective segments 6 are not individually perceived, but perceived as one merged light portion and as blurred light overall.

As described above, the manner in which light is perceived differs between the central visual field 20C and the peripheral visual field 20B due to the difference in resolution. Accordingly, even though the segments 6 are formed so as to exert the effect of suppressing near-sightedness in the central visual field 20C, the segments alone may not be able to exert the effect of suppressing near-sightedness in peripheral vision as well.

In order to exert the effect of suppressing near-sightedness in peripheral vision as well, it is conceivable to address the above-mentioned issue by making the lens structure of the eyeglass lens 1 different between the portion corresponding to the central visual field 20C and the portion corresponding to the peripheral visual field 20B. Specifically, it is conceivable to make the shape, power, or the like of the segments 6 different between the portion corresponding to the central visual field 20C and the portion corresponding to the peripheral visual field 20B, or to provide one of the portions with a stronger image surface curvature. However, when the lens structure is made partially different, the surface of the entire lens will become uneven and the appearance will be spoiled. Furthermore, when the eyeball is rotated, the correspondence between the distribution of the lens structure and the line of sight changes, and thus the effect may not always be sufficient. That is to say, it is not preferable to make the lens structure different between the portion corresponding to the central visual field 20C and the portion corresponding to the peripheral visual field 20B. Furthermore, it is not preferable to spoil the effect of suppressing near-sightedness in the central visual field 20C by considering peripheral vision.

Regarding this aspect, the inventor of the present application conducted a thorough examination. As a result, the inventor came up with the following lens structure with which the effect of suppressing near-sightedness in the central visual field 20C will not be spoiled and the effect of suppressing near-sightedness in peripheral vision will also be exerted to some extent.

For example, in peripheral vision, light is perceived as blurred light overall due to the difference in resolution from the central visual field 20C. That is to say, contrary to the case of the central visual field 20C, light is not perceived as being most focused at the position B (i.e., the position at +3.4 D). However, it is considered that, even when light is not perceived as being most focused at the position B, the effect of suppressing near-sightedness is exerted to some extent if light is perceived as being most focused (i.e., the diameter of the white circle in the drawing showing the perceived state of light is the smallest) (e.g., see the arrow E in FIG. 7) at a position that is closer to an object at least than the position A (i.e., the position at 0 D) is. Thus, in peripheral vision, in order to cause light to be perceived as being focused at a position that is closer to an object at least than the position A is, it is possible to use overlap of blurred images resulting from the low spatial resolution in the peripheral visual field 20B. That is to say, in peripheral vision, light spots formed through transmission through the respective segments 6 are perceived as blurred images due to the low resolution, and, if the light energy is increased by the overlapping portion of the blurred images, it is possible to allow the wearer to perceive light as if the light was focused at the overlapping portion. Hereinafter, the use of the overlap of blurred images to generate the perception of a pseudo-focusing point at a location other than the optical focal point is simply referred to as "pseudo-focusing". In order to generate such pseudo-focusing, it is sufficient that the size and the arrangement interval of the segments 6 are set such that blurred images perceived in peripheral vision overlap each other at a desired position (i.e., a position that is closer to an object at least than the position A is).

That is to say, the inventor of the present application came up with a lens structure in which the size and the arrangement interval of the plurality of segments 6 are set such that light perceived in peripheral vision is perceived as pseudo-focusing at a desired position (i.e., a position other than focal point A on the retina 20A), in order to exert the effect of suppressing the progression of a refractive error in peripheral vision with a low spatial resolution as well.

(3) Size and Arrangement Interval of Segments

Hereinafter, the size and the arrangement interval of the plurality of segments 6 in the eyeglass lens 1 according to this embodiment will be described.

The size of the segments 6 means an indicator for specifying physical values of the segments 6. For example, in the case in which each segment 6 is circular in a plan view, a diameter D that specifies the size of the segment 6 corresponds to an example of the size of the segment 6. Furthermore, a power P at a portion corresponding to the segment 6 determined by the curvature of the segment 6 or the like also corresponds to an example of the size of the segment 6. In this manner, as long as the physical values of the segment 6 can be specified, there is no particular limitation on the size of the segments 6, but typical examples thereof include the diameter D and the power P.

The arrangement interval of the segments 6 means an interval at which adjacent segments 6 are arranged. In particular, in this example, the arrangement interval refers to an interval L between reference points of the respective adjacent segments 6. The reference points of the segments 6 are points serving as a reference when specifying positions at which the segments 6 are arranged. For example, in the case in which the segments 6 are each circular in a plan view, center points of the respective segments 6 may be the reference points. Accordingly, if the center points are the reference points, the arrangement interval of the adjacent segments 6 corresponds to an arrangement pitch between the segments 6.

When the size and the arrangement interval of the segments 6 are determined, the density of the segments 6 on the lens surface, the area ratio of the segments 6 per unit area on the lens surface, and the like can also be specified.

In the description below, a lens structure in which the segments 6 are all circular in a plan view and the segments 6 are arranged in a hexagon formation in the eyeglass lens 1 will be described as an example.

In the eyeglass lens 1 according to this embodiment, in order to generate pseudo-focusing at a position other than the predetermined position A, the plurality of segments 6 are formed to have the size and the arrangement interval that satisfy conditions 1, 2, and 3, which will be described below. Note that it is not necessary to satisfy all of the conditions 1, 2, and 3. That is to say, in order to generate pseudo-focusing, it is sufficient to satisfy at least the condition 1, and it is preferable to satisfy both of the conditions 1 and 2 and more preferable to satisfy all of the conditions 1, 2, and 3.

Condition 1

The condition 1 for generating pseudo-focusing is, for example, to include at least three segments 6 within the range of the pupil 20D of the eyeball 20 of the wearer of the glasses in the case in which the segments 6 with substantially the same size are arranged in a hexagon formation.

Hereinafter, when the diameter of each of the segments 6 is taken as D, the area ratio of the segments 6 per unit area on the lens surface of the eyeglass lens 1 is taken as K, and the area of the pupil 20D when it is contracted most to typically have a pupil diameter of φ2 mm is taken as 7E, a total area of the segments 6 in a lens surface with the same area as that of the pupil 20D is KR, and an area S per segment 6 is $\pi(D/2)^2$. In order to ensure that three or more segments 6 are included in the lens surface with the same area as that of the pupil 20D, the area $S=\pi(D/2)^2$ has to be ⅓ of the total area $K\pi$. In summary, Expression (1) below is obtained.

$$S \leq K\pi/3$$

$$\pi(D/2)^2 \leq K\pi/3$$

$$D^2 \leq (4K/3) \quad (1)$$

Incidentally, in peripheral vision, light passes through the pupil 20D at an angle, and thus the area on the lens corresponding to the area of the pupil 20D may be small.

Figure 8:
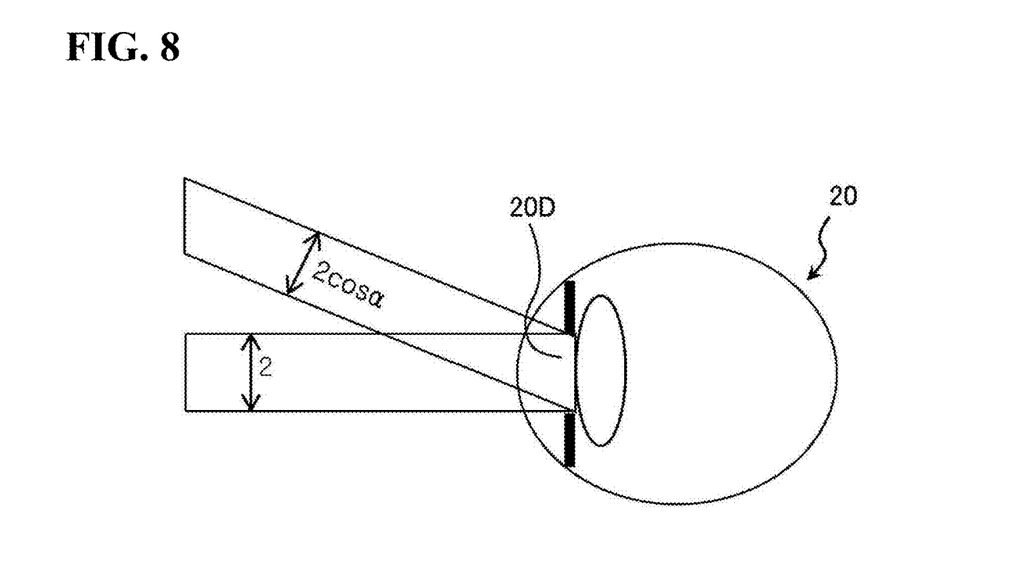
FIG. 8 is an explanatory view showing an example of a relationship between the angle of view and the pupil diameter area.

FIG. 8 is an explanatory view showing an example of a relationship between the angle of view and the pupil diameter area. For example, when the angle of view in peripheral vision is taken as a, as shown in the drawing, the area of the pupil 20D becomes small to cos α times.

Taking this into consideration, in order to ensure that three or more segments 6 are reliably included even in peripheral vision as well, Expression (2) is obtained from Expression (1) above where the set angle of the angle of view (i.e., an angle of light in peripheral vision formed with respect to light directed to the central fovea) is taken as θ and the right side is multiplied by cos θ.

$$D^2 \leq (4K/3) \times \cos \theta \quad (2)$$

In Expression (2) above, θ is the set angle of the angle of view, and, considering the typical angle of view, for example, it is sufficient to set the set angle to approximately θ=25° (50° for the total angle of view), and it is preferable to set the set angle to approximately θ=45° (90° for the total angle of view). That is to say, if θ=25°, three or more segments 6 are included in the pupil 20D at φ2 mm in the 25° peripheral vision. Furthermore, if θ=45°, three or more segments 6 are included in the pupil 20D at φ2 mm in the 45° peripheral vision.

Thus, the condition 1 for generating pseudo-focusing at a position other than the predetermined position A is to satisfy Expression (2)' below, and preferably to satisfy Expression (2)" below.

$$D^2 \leq (4K/3) \times \cos 25° \quad (2)'$$

$$D^2 \leq (4K/3) \times \cos 45° \quad (2)''$$

As described above, the condition 1 is to include at least three of the plurality of segments 6 in the lens surface within the range of the pupil 20D. If this condition 1 is satisfied, on the lens surface of the eyeglass lens 1, the size and the arrangement interval of the segments 6 are set such that a graphic formed by connecting the reference points of at least three respective segments 6 is an acute-angle triangle (a triangle in which all angles are smaller than a right angle (90°)) as seen in FIG. 5. As described above, the reference points of the segments 6 are points serving as a reference when specifying positions at which the segments 6 are arranged, and, for example, are center points of the respective segments 6. In the case in which a graphic formed by connecting the reference points is an acute-angle triangle, at least three segments 6 are efficiently arranged within the range of the pupil 20D with the limited size.

Condition 2

The condition 2 is to cause light spots to be perceived as being separated from each other at the position B at which light transmitted through the segments 6 is focused, so as not to spoil the effect of suppressing near-sightedness in the central visual field 20C even when pseudo-focusing is generated by satisfying the condition 1.

Figure 9:
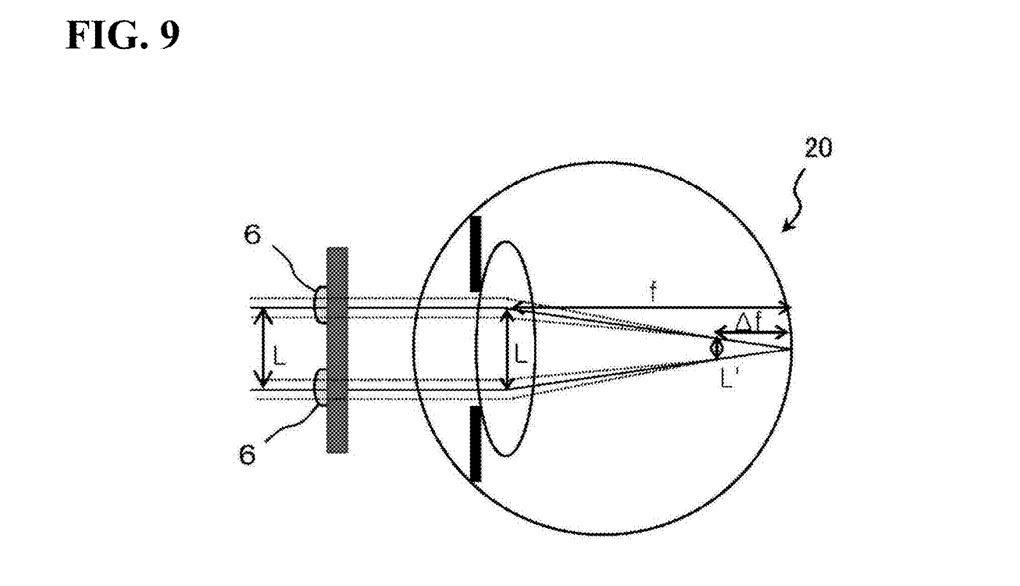
FIG. 9 is an explanatory view showing an example of a relationship between rays and segment intervals.

FIG. 9 is an explanatory view showing an example of a relationship between rays and segment intervals. In the drawings of this example, main rays that pass through the centers of the segments 6 are indicated by the solid lines, and rays that pass through points near the upper and lower ends of the segments 6 are indicated by the broken lines.

Hereinafter, when the interval between adjacent segments 6 is taken as L, the focal distance of (base region of eyeglass lens 1+eyeball 20) is taken as f, and the distance (focusing error) between the position A on the retina and the position B at which light transmitted through the segments 6 is focused is taken as Δf, the main ray interval (i.e., spot interval) L' at the position B at which light transmitted through the segments 6 is focused is obtained by Expression (3) below.

$$L' = L(\Delta f/f) \quad (3)$$

For example, when the power that is given to the segments 6 is taken as P, the power of (base region of eyeglass lens 1+eyeball 20) can be 60 D (diopter) based on standard emmetropia, and thus the power of a portion that passes through the segments 6 is 60+P. Since the focal distance is 1000 times the reciprocal of the power, f=1000/60, and Δf=1000/60−1000/(60+P). Accordingly, Δf/f=P/(60+P). Therefore, the spot interval L' can be replaced by Expression (4) below.

$$L' = LP/(60+P) \quad (4)$$

If the spot interval L' is greater than the resolution of an eye, the spots of the respective segments 6 are perceived as being separated from each other. Typically, the photoreceptor cells in the central fovea of the retina are arranged at a pitch of approximately 0.005 mm. Accordingly, if the spot interval L' is approximately L'≥0.010 mm, which is greater than twice the arrangement pitch of photoreceptor cells in the central fovea, and more preferably approximately L'≥0.020 mm, which is twice the value, the spots of the respective segments 6 can be reliably perceived as being separated from each other.

That is to say, the condition 2 for separating focusing spots of the respective segments 6 from each other is to satisfy Expression (5) below, and preferably to satisfy Expression (6) below, when the interval between adjacent segments 6 is taken as L and the power that is given to the segments 6 is taken as P.

$$LP/(60+P) \geq 0.010 \quad (5)$$

$$LP/(60+P) \geq 0.020 \quad (6)$$

If this condition 2 is satisfied, in particular if Expression (5) above is satisfied, the spot interval L' (i.e., the left side of the expression) becomes higher than the resolution (i.e., the right side of the expression) of the central visual field 20C, and thus, even when the segments 6 generate pseudo-focusing, the focusing spots of the respective segments 6 can be separated from each other, and the effect of suppressing near-sightedness in the central visual field 20C is not spoiled. Furthermore, in particular if Expression (6) above is satisfied, the margin will be twice as large as that in the above-described case, and thus the focusing spots of the respective segments 6 can be separated from each other even more reliably.

Condition 3

The condition 3 is to, even when a plurality of segments 6 are arranged on the lens surface of the eyeglass lens 1, make the appearance even at least in the entire region in which the segments 6 are arranged.

Specifically, the condition is to cause the segments 6 to have the largest value of a power difference ΔP of 0.25 or less, when the power difference between the segments 6 on the lens surface of the eyeglass lens 1 is taken as ΔP.

If this condition 3 is satisfied, the power difference ΔP between the segments 6 is suppressed, and thus the appearance of the lens becomes even and the appearance is not spoiled. Furthermore, when the segments 6 appear even, the lens wearer can see the external world evenly and obtain a very good field of vision.

Lens Evaluation

As described above, if at least the condition 1, preferably both of the conditions 1 and 2, and more preferably all of the conditions 1, 2, and 3 are satisfied, it is possible to obtain an eyeglass lens 1 in which a plurality of segments 6 are arranged such that pseudo-focusing is generated at a position other than the predetermined position A. In the eyeglass lens 1, whether or not the segments 6 generate pseudo-focusing can be verified (evaluated), for example, by the method described below.

The human visual field perceives images by an action similar to the Gabor transform (see J. Daugman, "Entropy reduction and decorrelation in visual coding by oriented neural receptive fields", Trans. on Biomedical Engineering, Vol. 36, No. 1, pp. 107-114(1989).). According to this document, how the human visual field perceives light can be verified (evaluated) to some extent using the evaluation value of the Gabor function shown in Expression (7) below. In Expression (7), x is the horizontal coordinate on the retina and y is the vertical coordinate on the retina, both in mm. In this example, the Gabor function in the x direction will be described as an example, but it is also possible to use the Gabor function in the y direction or intermediate directions.

$$G(x, y) = \exp\left\{-\frac{x^2 + y^2}{2a^2}\right\} \cos\left(\frac{2\pi x}{a}\right) \quad (7)$$

In evaluation using the Gabor function, for example, the Gabor function shown in Expression (7) above is convolved with a geometric optical spot (not a spot considering the spatial resolution of the human visual field), the largest value of the result of the convolution is used as the Gabor coefficient (i.e., the evaluation value using the Gabor function), and the evaluation value thereof is used to evaluation as to whether or not pseudo-focusing has been generated. The Gabor coefficient that is used for evaluation corresponds to the evaluation value of contrast as seen by humans. Specifically, Expression (7) above is calculated with a=0.015 in the central visual field and a=0.105 in the peripheral visual field, and the Gabor coefficient (evaluation value) is normalized to the value of 1 at the best focus position and displayed on a graph. As described in detail below, the graph may be created by plotting the distance (defocus amount, unit: diopter) between the predetermined position A on the retina and the position B at which light that is transmitted through the segments 6 is focused on the horizontal axis, and plotting the Gabor coefficient (the evaluation value using the Gabor function, unit: dimensionless quantity) on the vertical axis.

When such a graph is created, if pseudo-focusing has been generated between the segments 6 in peripheral vision, the evaluation value using the Gabor function for light that is transmitted through the segments 6 will have a maximum value at a position other than the predetermined position A (0 D). Accordingly, if the segments 6 are arranged such that the evaluation value using the Gabor function for light that is transmitted through the segments 6 in peripheral vision has a maximum value at a position other than the predetermined position A (0 D) in a graph that is a result of the evaluation using the Gabor function, the eyeglass lens 1 on which the segments 6 are arranged can be said to be an eyeglass lens in which the size and the arrangement interval of the segments 6 are set such that pseudo-focusing is generated at a position other than the predetermined position A.

The maximum value is preferably the largest value. However, the maximum value does not absolutely have to be the largest value, and, as long as the maximum value is large enough, it can be recognized as indicating pseudo-focusing even if it is not the largest value. For example, it is sufficient that the maximum value is larger than the median between the largest and smallest values.

EXAMPLES

Hereinafter, the present disclosure will be described in more detail by way of examples. The following is a description of Examples 1 and 2 and is a brief description of Comparative Examples 1 and 2. Furthermore, in Example 2 and Comparative Examples 1 and 2, results of evaluation using the Gabor function will be also described. It will be appreciated that the disclosure is not limited to the following examples.

Example 1

In Example 1, an eyeglass lens 1 was formed in which a plurality of segments 6 were arranged such that the diameter D of each segment 6 was 0.75 mm, the interval L between adjacent segments 6 was 1.01 mm, the area ratio K of the segments 6 was 0.5, and the power P that was given to the segments 6 was 3.5 D.

In the production of the eyeglass lens 1 with this configuration, first, the lens base member is molded using a known molding method such as cast polymerization. By using a mold having a molding surface equipped with a plurality of concave portions and performing molding through cast polymerization, for example, the lens base member having the convex regions on at least one surface is obtained. In this case, a mold having a plurality of concave portions suitable for the above-described use may be used.

Then, when the lens base member is obtained, next, a coating such as a hard coating film or an antireflection film is formed on the surface of the lens base member as necessary. The coating can be formed using the above-described known film-forming methods.

It is possible to obtain an eyeglass lens 1 having a plurality of convex regions (segments) 6 that project toward an object using the production method of this procedure.

For the eyeglass lens 1 according to Example 1 as described above, Expression (2)', which defines the condition 1, is calculated as follows: the left side is 0.563 and the right side is 0.604, and thus 0.563<0.604. That is to say, it matches the direction of the inequality in Expression (2)', and the condition 1 is satisfied.

Furthermore, for the eyeglass lens 1 according to Example 1, Expressions (5) and (6), which define the condition 2, are calculated as follows: the left side is 0.056 in both cases, and thus 0.056>0.010 and 0.056>0.020. That is to say, it matches the direction of the inequality in both of Expressions (5) and (6), and the condition 2 (including the more preferable case) is satisfied.

In this manner, the eyeglass lens 1 according to Example 1 satisfies both of the conditions 1 and 2, and thus it was confirmed that, in the eyeglass lens 1, the segments 6 generate pseudo-focusing at a position other than the predetermined position A on the retina, as a result of which the effect of suppressing near-sightedness can be exerted in the case of peripheral vision as well without spoiling the effect of suppressing near-sightedness in the central visual field 20C.

Example 2

In Example 2, an eyeglass lens 1 was formed in which a plurality of segments 6 were arranged such that the diameter D of each segment 6 was 0.6 mm, the interval L between adjacent segments 6 was 0.81 mm, the area ratio K of the segments 6 was 0.5, and the power P that was given to the segments 6 was 3.5 D. This eyeglass lens 1 can be obtained using the same production method as that of Example 1.

For the eyeglass lens 1 according to Example 2 as described above, Expression (2)', which defines the condition 1, is calculated as follows: the left side is 0.360 and the right side is 0.604, and thus 0.360<0.604. Furthermore, Expression (2)", which is preferable, is calculated as follows: the left side is 0.360 and the right side is 0.471, and thus 0.360<0.471. That is to say, it matches the direction of the inequality in both of Expressions (2)' and (2)", and the condition 1 (including the more preferable case) is satisfied.

Furthermore, for the eyeglass lens 1 according to Example 2, Expressions (5) and (6), which define the condition 2, are calculated as follows: the left side is 0.045 in both cases, and thus 0.045>0.010 and 0.045>0.020. That is to say, it matches the direction of the inequality in both of Expressions (5) and (6), and the condition 2 (including the more preferable case) is satisfied.

In this manner, the eyeglass lens 1 according to Example 2 satisfies both of the conditions 1 and 2, and thus it was confirmed that, in the eyeglass lens 1, the segments 6 generate pseudo-focusing at a position other than the predetermined position A on the retina. This aspect was confirmed as will be described below by obtaining a Gabor coefficient, which is an evaluation value using the Gabor function, and plotting the Gabor coefficient in a graph.

Figure 10:
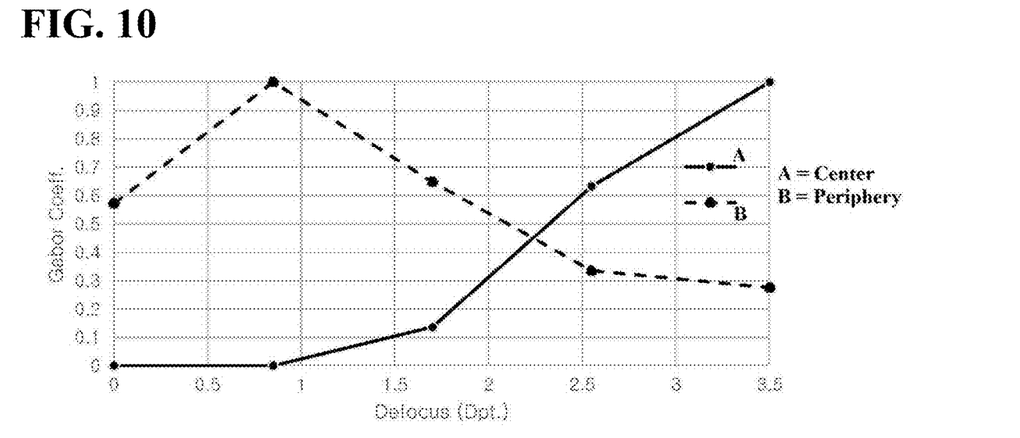
FIG. 10 is an explanatory view showing an example of a graph of the Gabor coefficient (evaluation value) regarding an eyeglass lens according to Example 2 of the present disclosure.

FIG. 10 is an explanatory view showing an example of a graph of the Gabor coefficient (evaluation value) for the eyeglass lens 1 according to Example 2. In this graph, the horizontal axis shows the distance (defocus amount) between the predetermined position A (0 D) on the retina and the position B (3.5 D) at which light that is transmitted through the segments 6 is focused, and the vertical axis shows the Gabor coefficient (the evaluation value using the Gabor function) that is a Gabor coefficient (evaluation value) normalized to the value of 1 at the best focus position. In this graph, the Gabor coefficient calculated considering the resolution of the central visual field 20C is indicated by the solid line, and the Gabor coefficient calculated considering the resolution of the peripheral visual field 20B (i.e., the Gabor coefficient in the case of peripheral vision) is indicated by the broken line.

It is seen from the graph shown in FIG. 10 that the Gabor coefficient has a maximum value at a position at 0.85 D, which is a position other than the predetermined position A (0 D) in the case of peripheral vision indicated by the broken line. That is to say, the eyeglass lens 1 according to Example 2 can be said to be an eyeglass lens in which the size and the arrangement interval of the segments 6 are set such that pseudo-focusing is generated at a position at 0.85 D, which is a position other than the predetermined position A (0 D). Note that, when light is perceived in the central visual field 20C indicated by the solid line, the Gabor coefficient has the largest value at a position at 3.5 D, which is the position B (defocused position).

As described above, the eyeglass lens 1 according to Example 2 satisfies both of the conditions 1 and 2, and thus it was confirmed that the segments 6 generate pseudo-focusing at a position other than the predetermined position A on the retina, so that the effect of suppressing near-sightedness can be exerted in the case of peripheral vision as well, and, even in that case, the effect of suppressing near-sightedness in the central visual field 20C is not spoiled.

Comparative Example 1

Hereinafter, an eyeglass lens according to Comparative Example 1 will be briefly described. The eyeglass lens according to Comparative Example 1 has segments formed of the same size as the eyeglass lens 1 according to Example 2 described above, but the interval between adjacent segments is larger than that of Example 2, so that the condition 1 is not satisfied.

Figure 11:
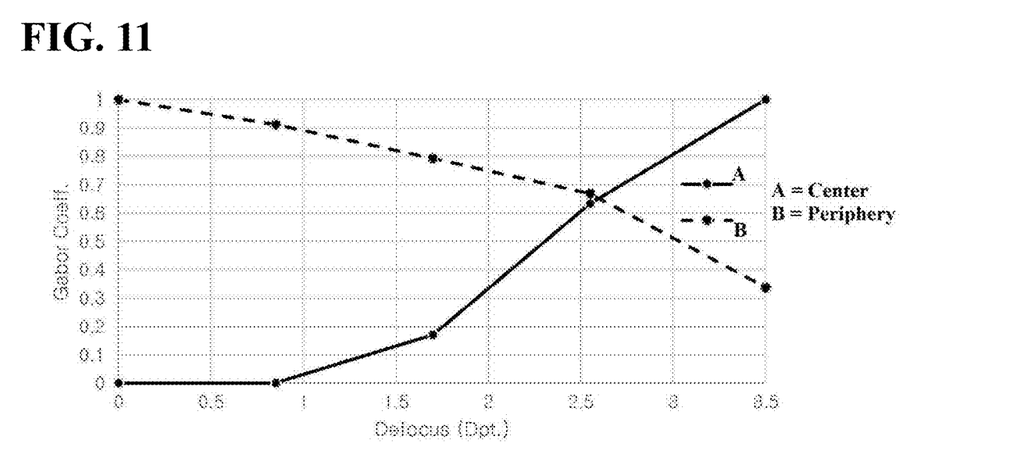
FIG. 11 is an explanatory view showing an example of a graph of the Gabor coefficient (evaluation value) regarding an eyeglass lens according to Comparative Example 1.

FIG. 11 is an explanatory view showing an example of a graph of the Gabor coefficient (evaluation value) regarding the eyeglass lens according to Comparative Example 1. In this graph as well, the horizontal axis, the vertical axis, the solid line, the broken line, and the like are as in the graph shown in FIG. 10.

It is seen from the graph shown in FIG. 11 that the Gabor coefficient has a maximum value at the predetermined position A (0 D) in the case of peripheral vision indicated by the broken line. That is to say, the eyeglass lens according to Comparative Example 1 does not satisfy the condition 1, and thus pseudo-focusing is not generated at a position other than the predetermined position A (0 D). Accordingly, the eyeglass lens according to Comparative Example 1 cannot exert the effect of suppressing near-sightedness in the case of peripheral vision.

Comparative Example 2

Then, an eyeglass lens according to Comparative Example 2 will be briefly described. The eyeglass lens according to Comparative Example 2 has segments formed of the same size as the eyeglass lens 1 according to Example 2 described above, but the interval between adjacent segments is smaller than that of Example 2, so that the condition 2 is not satisfied.

Figure 12:
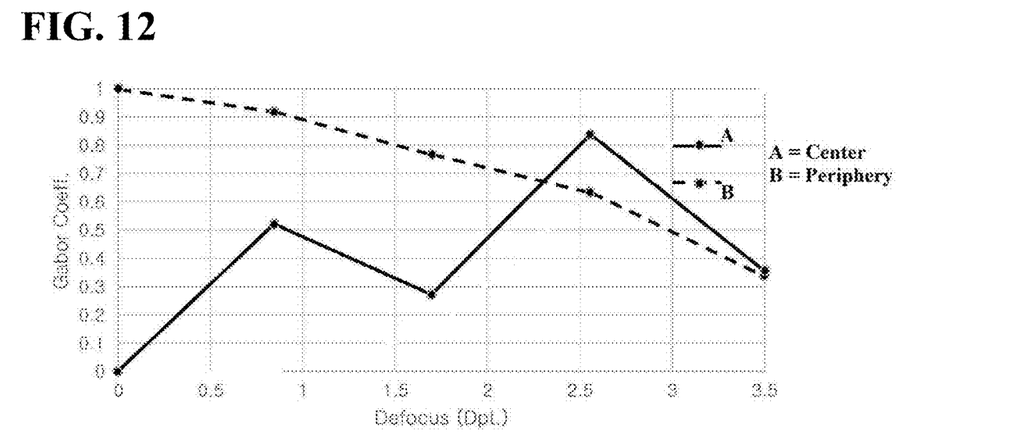
FIG. 12 is an explanatory view showing an example of a graph of the Gabor coefficient (evaluation value) regarding an eyeglass lens according to Comparative Example 2.

FIG. 12 is an explanatory view showing an example of a graph of the Gabor coefficient (evaluation value) regarding the eyeglass lens according to Comparative Example 2. In this graph as well, the horizontal axis, the vertical axis, the solid line, the broken line, and the like are as in the graph shown in FIG. 10.

It is seen from the graph shown in FIG. 12 that the Gabor coefficient does not have a maximum value at a position at 3.5 D, which is the position B (defocused position), in the case of perception in the central visual field 20C indicated by the solid line. That is to say, the eyeglass lens according to Comparative Example 2 does not satisfy the condition 2, and thus the effect of suppressing near-sightedness in the central visual field 20C may be spoiled. Moreover, the Gabor coefficient has a maximum value at the predetermined position A (0 D) in peripheral vision indicated by the broken line as well. Accordingly, pseudo-focusing is not generated at a position other than the predetermined position A (0 D), and the effect of suppressing near-sightedness cannot be exerted in the case of peripheral vision either.

Modified Examples, Etc.

Although the embodiments and examples of the present disclosure have been described above, the technical scope of the disclosure is not limited to the above-described exemplary disclosure, but can be modified in various ways without departing from the gist thereof.

For example, in the above-described disclosure, the eyeglass lens 1 with the configuration in which the object-side surface 3 has the convex regions 6 was described as an example, but the present disclosure can also be applied to eyeglass lenses with other configurations. That is to say, the disclosure can be applied not only to the lens structure in which the lens surface has the convex regions 6 but also to lens structures in which the lens surface is flat, as long as the eyeglass lens includes a first region formed such that light transmitted therethrough is focused at a predetermined position and a plurality of second regions formed such that light transmitted therethrough is focused at a defocused position different from that of the first region.

Furthermore, for example, in the above-described disclosure, the case in which the eyeglass lens is a near-sightedness progression suppressing lens was mainly described as an example, but the present disclosure can also be applied to far-sightedness progression suppressing lenses.

Furthermore, for example, in the above-described disclosure, the case in which the convex regions (segments) 6 are arranged in a hexagon formation was mainly described as an example, but the present disclosure is not limited thereto.

That is to say, the disclosure can be applied not only to the hexagon formation but also to other arrangements in which convex regions (segments) are arranged so as to generate pseudo-focusing in peripheral vision.

REFERENCE SIGNS LIST

1 Eyeglass lens
3 Object-side surface
4 Eyeball-side surface
6 Convex region (segment)
20 Eyeball
20A Retina
20B Peripheral visual field
20C Central visual field

The invention claimed is:

1. An eyeglass lens comprising:
a first region formed such that light transmitted therethrough is focused at a predetermined position in an eye; and
a plurality of second regions formed such that light transmitted therethrough is focused at a position defocused from the predetermined position, wherein
the plurality of second regions are formed to have a size and an arrangement interval such that light perceived in peripheral vision is perceived as pseudo-focusing at a position other than the predetermined position, and
$D^2 \leq (4K/3) \times \cos 25°$ is satisfied, when a diameter of each of the second regions that are circular in a plan view is taken as D (in units of mm), and an area ratio of the second regions per unit area on the lens surface is taken as K.

2. The eyeglass lens according to claim 1, wherein the size and the arrangement interval of the plurality of second regions are set such that an evaluation value using a Gabor function for the transmitted light in the peripheral vision has a maximum value at a position other than the predetermined position.

3. The eyeglass lens according to claim 2, wherein the size and the arrangement interval of the plurality of second regions are set such that the evaluation value using the Gabor function for the transmitted light in the peripheral vision has a largest value at the position other than the predetermined position.

4. The eyeglass lens according to claim 3, wherein the size and the arrangement interval of the plurality of second regions are set such that at least three of the plurality of second regions are arranged within a range of a diameter of a pupil through which the transmitted light passes and such that a graphic formed by connecting reference points of the respective three second regions is an acute-angle triangle.

5. The eyeglass lens according to claim 4, wherein $D^2 \leq (4K/3) \times \cos 45°$ is satisfied.

6. The eyeglass lens according to claim 1, wherein the size and the arrangement interval of the plurality of second regions are set such that an evaluation value using a Gabor function for the transmitted light in the peripheral vision has a largest value at a position other than the predetermined position.

7. The eyeglass lens according to claim 1, wherein the size and the arrangement interval of the plurality of second regions are set such that at least three of the plurality of second regions are arranged within a range of a diameter of a pupil through which the transmitted light passes and such that a graphic formed by connecting reference points of the respective three second regions is an acute-angle triangle.

8. The eyeglass lens according to claim 1, wherein $D^2 \leq (4K/3) \times \cos 45°$ is satisfied.

9. The eyeglass lens according to claim 1, wherein $LP/(60+P) \geq 0.010$ is satisfied, when an interval between adjacent second regions is taken as L (in units of mm), and a power that is given to the second regions is taken as P (in units of diopter).

10. The eyeglass lens according to claim 1, wherein a power difference ΔP (in units of diopter) between the plurality of second regions has a largest value of 0.25 or less.

11. The eyeglass lens according to claim 1, wherein the plurality of second regions are arranged in a hexagon formation.

12. The eyeglass lens according to claim 1, wherein the plurality of second regions are arranged such that at least three of the plurality of second regions are included within a range of the lens surface that is the same as a range of φ2 mm, which is a pupil diameter through which the transmitted light passes.

13. The eyeglass lens according to claim 12, wherein the size and the arrangement interval of the plurality of second regions are set such that a graphic formed by connecting reference points of the respective three second regions is an acute-angle triangle.

14. An eyeglass lens comprising:
a first region formed such that light transmitted therethrough is focused at a predetermined position in an eye; and
a plurality of second regions formed such that light transmitted therethrough is focused at a position defocused from the predetermined position, wherein
the plurality of second regions are formed to have a size and an arrangement interval such that at least three of the plurality of second regions are arranged within a range of a diameter of a pupil through which the transmitted light passes and such that a graphic formed by connecting reference points of the respective three second regions is an acute-angle triangle, and
$D^2 \leq (4K/3) \times \cos 25°$ is satisfied, when a diameter of each of the second regions that are circular in a plan view is taken as D (in units of mm), and an area ratio of the second regions per unit area on the lens surface is taken as K.

15. The eyeglass lens according to claim 14, wherein $D^2 \leq (4K/3) \times \cos 45°$ is satisfied.

16. The eyeglass lens according to claim 15, wherein $LP/(60+P) \geq 0.010$ is satisfied, when an interval between adjacent second regions is taken as L (in units of mm), and a power that is given to the second regions is taken as P (in units of diopter).

17. The eyeglass lens according claim 16, wherein a power difference ΔP between the plurality of second regions has a largest value of 0.25 or less.

18. The eyeglass lens according to claim 14, wherein $LP/(60+P) \geq 0.010$ is satisfied, when an interval between adjacent second regions is taken as L (in units of mm), and a power that is given to the second regions is taken as P (in units of diopter).

19. The eyeglass lens according claim 14, wherein a power difference ΔP (in units of diopter) between the plurality of second regions has a largest value of 0.25 or less.

* * * * *